United States Patent
Bai et al.

(10) Patent No.: US 10,984,337 B2
(45) Date of Patent: Apr. 20, 2021

(54) CONTEXT-BASED SEARCH QUERY FORMATION

(75) Inventors: Peng Bai, Beijing (CN); Zheng Chen, Beijing (CN); Xuedong David Huang, Bellevue, WA (US); Xiaochuan Ni, Beijing (CN); Jian-Tao Sun, Beijing (CN); Zhimin Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/408,853

(22) Filed: Feb. 29, 2012

(65) Prior Publication Data

US 2013/0226935 A1 Aug. 29, 2013

(51) Int. Cl.
*G06N 20/00* (2019.01)
*G06F 16/332* (2019.01)

(52) U.S. Cl.
CPC ......... *G06N 20/00* (2019.01); *G06F 16/3322* (2019.01)

(58) Field of Classification Search
CPC .............................. G06N 20/00; G06F 16/3322
USPC ........................... 707/723, 765, E17.069, 769
See application file for complete search history.

(56) References Cited

U.S. PATENT DOCUMENTS

| | | | |
|---|---|---|---|
| 5,252,951 A | 10/1993 | Tannenbaum et al. | |
| 6,591,266 B1 * | 7/2003 | Li | G06F 17/30902 |
| 6,598,072 B1 | 7/2003 | McBrearty et al. | |
| 6,968,333 B2 * | 11/2005 | Abbott et al. | |
| 7,355,620 B2 | 4/2008 | Ikehata et al. | |
| 7,487,461 B2 | 2/2009 | Zhai et al. | |
| 7,499,003 B2 | 3/2009 | Rudolph et al. | |
| 7,657,518 B2 * | 2/2010 | Budzik et al. | 707/723 |
| 7,877,707 B2 | 1/2011 | Westerman et al. | |
| 8,407,606 B1 | 3/2013 | Davidson et al. | |
| 8,438,473 B2 | 5/2013 | Mak et al. | |
| 2003/0142081 A1 | 7/2003 | Iizuka et al. | |
| 2005/0027704 A1 * | 2/2005 | Hammond | G06F 17/30699 |

(Continued)

FOREIGN PATENT DOCUMENTS

| | | |
|---|---|---|
| CN | 101124609 | 2/2008 |
| JP | 200679366 | 3/2006 |

(Continued)

OTHER PUBLICATIONS

User Manual for the Examiners Automated Search Tool (EAST) 2.1 5 May 06, Computer Sciences Corporation, Version 1.3, 256 pages.*

(Continued)

*Primary Examiner* — Jason G Liao
(74) *Attorney, Agent, or Firm* — Schwegman Lundberg & Woessner, P.A.

(57) ABSTRACT

Searching is assisted by recognizing a selection of text from a document as an indication that a user wishes to initiate a search based on the selected text. The user is provided with query suggestions based on the selected text and the query suggestions are ranked based on a context provided by the document. The user may select the text by using a mouse, drawing a circle around the text on a touch screen, or by other input techniques. The query suggestions may be based on query reformulation or query expansion techniques applied to the selected text. Context provided by the document is used by a language model and/or an artificial intelligence system to rank the query suggestions in predicted order of relevance based on the selected text and the context.

20 Claims, 5 Drawing Sheets

(56) References Cited

U.S. PATENT DOCUMENTS

| | | | |
|---|---|---|---|
| 2005/0028156 A1* | 2/2005 | Hammond | G06F 17/30699 718/100 |
| 2005/0154723 A1* | 7/2005 | Liang | 707/3 |
| 2005/0283468 A1* | 12/2005 | Kamvar | G06F 17/3064 |
| 2006/0053154 A1 | 3/2006 | Yano | |
| 2006/0101354 A1 | 5/2006 | Hashimoto et al. | |
| 2006/0136406 A1 | 6/2006 | Reponen | |
| 2006/0253793 A1 | 11/2006 | Zhai et al. | |
| 2006/0284852 A1 | 12/2006 | Hofmeister et al. | |
| 2007/0136283 A1 | 6/2007 | Silverbrook et al. | |
| 2007/0185861 A1 | 8/2007 | Budzik et al. | |
| 2007/0247435 A1 | 10/2007 | Benko et al. | |
| 2008/0005074 A1 | 1/2008 | Flake et al. | |
| 2008/0040323 A1 | 2/2008 | Joshi | |
| 2008/0250012 A1 | 10/2008 | Hinckley et al. | |
| 2008/0263142 A1 | 10/2008 | Glass et al. | |
| 2009/0003658 A1 | 1/2009 | Zhang et al. | |
| 2009/0006343 A1 | 1/2009 | Platt et al. | |
| 2009/0055356 A1 | 2/2009 | Hanyu | |
| 2009/0059730 A1 | 3/2009 | Lyons et al. | |
| 2009/0106221 A1 | 4/2009 | Meyerzon et al. | |
| 2009/0167705 A1 | 7/2009 | Chen | |
| 2009/0228792 A1 | 9/2009 | van Os et al. | |
| 2009/0228825 A1 | 9/2009 | van Os et al. | |
| 2009/0259643 A1 | 10/2009 | Peng et al. | |
| 2009/0287626 A1 | 11/2009 | Paek et al. | |
| 2009/0287657 A1 | 11/2009 | Bennett | |
| 2009/0288044 A1 | 11/2009 | Matthews et al. | |
| 2009/0307205 A1 | 12/2009 | Churchill et al. | |
| 2010/0042935 A1 | 2/2010 | Malden et al. | |
| 2010/0057714 A1 | 3/2010 | Miedema | |
| 2010/0083155 A1 | 4/2010 | Farago et al. | |
| 2010/0105370 A1 | 4/2010 | Kruzeniski et al. | |
| 2010/0105443 A1 | 4/2010 | Vaisanen | |
| 2010/0106801 A1 | 4/2010 | Bliss et al. | |
| 2010/0146012 A1 | 6/2010 | Beaudreau et al. | |
| 2010/0228710 A1* | 9/2010 | Imig | G06F 17/30867 707/706 |
| 2010/0229125 A1 | 9/2010 | Cha | |
| 2010/0241663 A1 | 9/2010 | Huang et al. | |
| 2010/0245263 A1 | 9/2010 | Parada, Jr. | |
| 2010/0302172 A1 | 12/2010 | Wilairat | |
| 2011/0055753 A1 | 3/2011 | Horodezky et al. | |
| 2011/0072033 A1 | 3/2011 | White et al. | |
| 2011/0145232 A1 | 6/2011 | Chang et al. | |
| 2011/0161311 A1* | 6/2011 | Mishne et al. | 707/719 |
| 2011/0161852 A1 | 6/2011 | Vainio et al. | |
| 2011/0179021 A1 | 7/2011 | Wen et al. | |
| 2011/0179024 A1 | 7/2011 | Stiver et al. | |
| 2011/0208730 A1* | 8/2011 | Jiang | G06F 17/30864 707/727 |
| 2012/0044179 A1 | 2/2012 | Hudson | |
| 2012/0131019 A1 | 5/2012 | Sugiura | |
| 2014/0223381 A1 | 8/2014 | Huang et al. | |

FOREIGN PATENT DOCUMENTS

| | | |
|---|---|---|
| JP | 200953757 | 3/2009 |
| JP | WO2011145272 | 11/2011 |
| KR | 20000063555 | 11/2000 |
| KR | 20010103532 | 11/2001 |
| KR | 20060021722 A | 3/2006 |
| RU | 2360281 C2 | 6/2009 |
| WO | WO2006137993 | 12/2006 |
| WO | WO 2008002638 A1 * | 1/2008 |
| WO | WO 2010065195 A1 * | 6/2010 |
| WO | WO2011024585 | 3/2011 |

OTHER PUBLICATIONS

The Bluebook: A Uniform System of Citation 2004, Harvard Law Review Assoc., 17 ed. 8th printing, pp. 21-11, inside back cover.*

Monroe, Correct Horse Battery Staple 10 Aug 11, xkcd.com, https://xkcd.com/936/.*

Collingwood et al., Tradeoffs in Accuracy and Efficiency in Supervised Learning Methods 2011, The Journal of Information Technology and Politics, JITP 2011, http://scholarworks.umass.edu/cgi/viewcontent.cgi?article=1005&context=jitpc2011.*

HTML 4.01 Specification, Dec. 24, 1999, W3C, http://www.w3.org/TR/html401/, http://www.w3.org/TR/html401/struct/links.html.*

Internet Explorer 8: Features, "Accelerators", retrieved on Mar. 7, 2011 at <<http://www.microsoft.com/windows/internet-explorer/features/faster.aspx>>, 3 pages.

Aula, "Query Formulation in Web Information Search", <<http://www.iadis.net/dl/final_uploads/200302L052.pdf>>, IADIS International Conference WWW/Internet 2003, vol. I, 8 pages.

Bounding box, radius, and polygon search—Retrieved Date: Oct. 25, 2010 at <<http://msdn.microsoft.com/en-us/library/cc451895.aspx>>, 11 pages.

Google's gesture search available for android 1.6—Published Date: Mar. 17, 2010, retrieved at <<http://blog.itechtalk.com/2010/googles-gesture-search-available-for-android-1-6>>, 5 pages.

HotPads Daily, "Launching 2011 with Hand-Drawn Housing Search," retrieved on Sep. 6, 2011 at <<http://daily.hotpads.com/hotpads_daily/2011/01/launching-2011-with-hand-d . . . >>, Jan. 3, 2011, 3 pages.

Lasso Search—HotPads.com, retrieved on Sep. 6, 2011, at <<http://hotpads.com/pages/features/lassoSearch.htm>>, 3 pages.

McArthur, et al., "The Ranking of Query Refinements in Interactive Web-based Retrieval", <<http://citeseerx.ist.psu.edu/viewdoc/download?doi=10.1.1.33.1493&rep=rep1&type=pdf>>, Information Doors Workshop, 2000, 4 pages.

Moustakas, et al., "Master-Piece: A Multimodal (Gesture+Speech) Interface for 3D Model Search and Retrieval Integrated in a Virtual Assembly Application", Published Date: Aug. 2005, 14 pages.

Nudelman, "Design Patterns for Mobile Faceted Search: Part I", Published Date: Apr. 5, 2010, retrieved at <<http://www.uxmatters.com/mt/archives/2010/04/design-patterns-for-mobile-faceted-search-part-i.php>>, 9 pages.

Reimagining mobile search: introducing Yahoo!(R) Sketch-a-Search (TM) and yahoo! search for the iPhone (R)—Published Date: Mar. 23, 2010, retrieved at <<http://ymobileblog.com/blog/2010/03/23/reimagining-mobile-search-introducing-yahoo%C2%AE-sketch-a-search%E2%84%A2-and-yahoo-search-for-the-iphone%C2%AE-2/>>, 6 pages.

Schaal, "Is HotPads Lasso Search an alternative to Google Hotel Finder shape drawing?" retreived on Sep. 6, 2011 at <<http://www.tnooz.com/2011/08/08/news/is-hotpads-lasso-search-an-alternativ . . . >>, Aug. 8, 2011, 6 pages.

Yahoo search circle allows users to easily expand & narrow results on map—Published Date: Apr. 24, 2008, retrieved at <<http://searchengineland.com/yahoo-search-circle-allows-users-to-easily-expand-narrow-results-on-map-13854>>, 12 pages.

Yahoo! Sketch-a-Search, retrieved on Mar. 7, 2011 at <<http://itunes.apple.com/us/app/yahoo-sketch-a-search/id361077521?mt=8>>, 3 pages.

Yang, et al., "A Web Interface for Visualizing Web Search Engine Results", 3rd International Conference on Parallel and Distributed Computing, Applications, and Techniques (PDCAT 2002), 6 pages.

Office action for U.S. Appl. No. 13/017,335, dated Oct. 25, 2012, Huang et al., "Gesture-Based Search", 32 pages.

Office action for U.S. Appl. No. 13/017,335, dated May 20, 2013, Huang et al., "Gesture-Based Search", 33 pages.

The European Office Action dated Oct. 21, 2014 for European patent application No. 11866113.1, a counterpart foreign application of U.S. Appl. No. 13/201,823, 5 pages.

The Supplementary European Search Report dated Oct. 6, 2014 for European patent application No. 11866113.1, 3 pages.

Office action for U.S. Appl. No. 13/017,335, dated May 15, 2015, Huang et al., "Gesture-Based Search", 36 pages.

Office action for U.S. Appl. No. 13/201,823, dated May 21, 2015, Huang et al., "Invisible Control", 40 pages.

Office action for U.S. Appl. No. 13/201,823, dated Oct. 27, 2015, Huang et al., "Invisible Control", 42 pages.

(56) References Cited

OTHER PUBLICATIONS

Non-Final Office action for U.S. Appl. No. 13/017,335, dated Sep. 18, 2015, Huang et al., "Gesture-Based Search", 35 pages.
Office Action for U.S. Appl. No. 13/201,823, dated Jul. 17, 2014, Xuedong Huang, "Invisible Control", 35 pages.
Office action for U.S. Appl. No. 13/017,335, dated Sep. 11, 2014, Huang et al, "Gesture-Based Search", 33 pages.
Office action for U.S. Appl. No. 13/017,335, dated Apr. 30, 2014, Huang et al, "Gesture-Based Search", 32 pages.
International Search Report and Written Opinion dated May 15, 2013 for PCT/US2013/024247, 10 pages.
The European Office Action dated Jan. 22, 2015 for European patent application No. 13755014.1, a counterpart foreign application of U.S. Appl. No. 13/408,853, 5 pages.
The Supplementary European Search Report dated Jan. 14, 2015 for European Patent Application No. 13755014.1, 3 pages.
Office action for U.S. Appl. No. 13/017,335, dated Jan. 15, 2015, Huang et al, "Gesture-Based Search", 35 pages.
Office Action for U.S. Appl. No. 13/201,823, dated Jan. 9, 2015, Xuedong Huang, "Invisible Control", 41 pages.
Office action for U.S. Appl. No. 13/017,335, dated Feb. 5, 2016, Huang et al., "Gesture-Based Search", 37 pages.
The Chinese Office Action dated Jun. 2, 2016 for Chinese patent application No. , a counterpart foreign application of U.S. Appl. No. 13/201,823, 24 pages.
Office action for U.S. Appl. No. 13/201,823, dated Jun. 15, 20106, Huang et al., "Invisible Control", 46 pages.
The Japanese Office Action dated Oct. 4, 2016 for Japanese Patent Application No. 2014-559900, a counterpart foreign application of U.S. Appl. No. 13/408,853, 5 pages.
Uchiumi, et al., "Abbreviation Expansion with Query and Click Through Logs", IPSJ SJG Technical Report, Information Processing Society of Japan, vol. 2010-NL-199, No. 4, Nov. 18, 2010, 10 pages.
First Office Action and Search Report Issued in Chinese Patent Application No. 201380011778.6, dated Nov. 4, 2016, 15 Pages.
"Office Action Issued in Japanese Application No. 2014-559900", dated May 23, 2017, 3 Pages.
"Office Action Issued in Australian Patent Application No. 2013226549", dated Jun. 26, 2017, 3 Pages.
"Second Office Action Issued in Chinese Patent Application No. 201380011778.6", dated Jul. 3, 2017, 11 Pages.
"Third Office Action Issued in Chinese Patent Application No. 201380011778.6", dated Jan. 22, 2018, 7 Pages.
"Office Action Issued in Indian Patent Application No. 6205/CHENP/2014", dated Jan. 22 2020, 6 Pages.
"Office Action Issued in Brazilian Patent Application No. BR112014019703-2", dated Dec. 24, 2019, 5 Pages.
"Office Action Issued in Korean Patent Application No. 1020147024197", (w/ English Translation), dated Jan. 22, 2019, 12 Pages.
"Office Action Issued in Canada Patent Application No. 2,861,121", dated Jan. 18, 2019, 7 Pages.

* cited by examiner

CONTEXT-BASED SEARCH QUERY FORMATION

BACKGROUND

Many Internet searches are triggered by a web page that a user is browsing. That is, the user decides to initiate a search after consuming content on the web page. In order to implement the search, the user must leave the web page to access a search engine. The user may copy and paste words from the web page into a search box or manually compose a search query for entry into a search box or a search engine web page. Either technique for generating the search query may suffer from deficiencies such as lack of specificity, search terms with multiple meanings, and ambiguous relationships between the search terms.

After the search results are returned, the user may leave the searching interface and return to web browsing. This alternation between a web page and a searching interface is inefficient. Moreover, the interaction with various user interfaces (e.g., text selection, copy, paste, etc.) can become tedious particularly on small form factor devices or devices with limited ability to input text such as mobile phones, tablets computers, game consoles, televisions, etc. As an increasing number of users accesses web pages and other electronic documents through devices other than traditional computers, there will be an increasing need to smoothly integrate document consumption and searching. A system that can do so and additionally provide improved search queries will benefit users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure explains techniques for using both the area of a user's attention on a web page, or other document, as well as the surrounding context to generate and rank multiple search queries. While browsing a web page the user selects text from the web page. The selection of the text also generates a command to use that text as the starting point for generating candidate queries—search queries that may yield results relevant to the selected text. Multiple types of search query expansion or search query reformulation techniques may be applied to generate multiple candidate queries from the selected text. The user may then select one of these search queries to submit to a search engine. Thus, the act of browsing is combined with the act of searching, creating an interface that enables "Browsing to Search" by simply selecting text from the web page and then selecting one of the candidate queries.

In order to guide the user to a search query from the set of candidate queries, the context of the document is considered. Evaluation of the candidate queries in light of the context provided by the browsed web page is used to rank the respective candidate queries. Considering the surrounding context aids in ranking the candidate queries because the browsed web page may contain words which can be used (possibly with modifications) to disambiguate terms in the candidate queries and compare the candidate queries to previous search queries related to the same web page.

Ranking of the candidate queries may be performed by a language model, a classification method, or a combination of both. The language model may be implemented as a model that determines the probability of a candidate query given the selected text and the surrounding context. The classification method uses training data that contains selected text on web pages and associated queries. Human reviewers determine if the selected text of the web page likely resulted in a user making the associated search query. If so, the selected text and query pair is used by a machine learning system to learn a function that predicts a confidence level for a candidate query given the selected text and the context.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Illustrative Architecture

Figure 1:
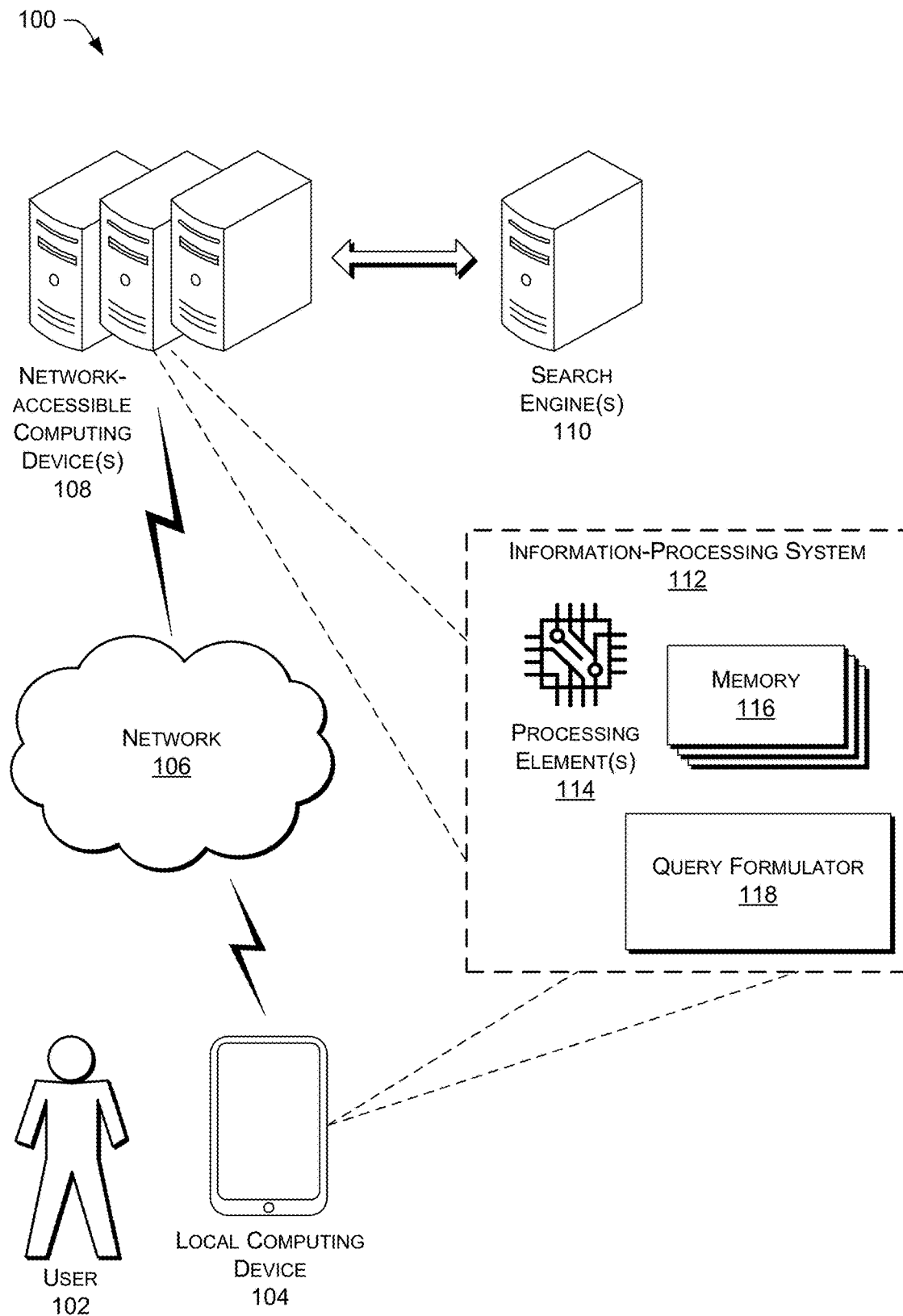
FIG. 1 is an illustrative architecture showing an information-processing system including a query formulator.

FIG. 1 shows an architecture 100 in which a user 102 can interact with a local computing device 104 to obtain search queries. The local computing device 104 may be any type of computing device such as a desktop computer, a notebook computer, a tablet computer, a smart phone, a game console, a television, etc. Local computing device 104 may communicate via a network 106 with one or more network-accessible computing devices 108. The network 106 may be any one or more types of data communications networks such as a local area network, wide area network, the Internet, a telephone network, a cable network, peer-to-peer network, a mesh network, and the like. The network-accessible computing devices 108 may be implemented as any type or combination of types of computing devices such as network servers, Web servers, file servers, supercomputers, desktop computers, and the like. The network-accessible computing devices 108 may include or be commutatively connected to one or more search engines 110. The search engine(s) 110 may be implemented on one or more dedicated computing devices maintained by an entity that provides the searching services.

An information-processing system 112 contains one or more processing elements 114 and memory 116 distributed throughout one or more locations. The processing elements 114 may include any combination of central processing units (CPUs), graphical processing units (GPUs), single core processors, multi-core processors, application-specific integrated circuits (ASICs), and the like. One or more processing element(s) 114 may be implemented in software and/or firmware in addition to hardware implementations. Software or firmware implementations of the processing element(s) 114 may include computer- or machine-executable instructions written in any suitable programming language to perform the various functions described. Software implementations of the processing elements(s) 114 may be stored in whole or part in the memory 116.

The memory 116 may store programs of instructions that are loadable and executable on the processing element(s) 114, as well as data generated during the execution of these programs. Examples of programs and data stored on the memory 116 may include an operating system for controlling operations of hardware and software resources available to the local computing device 104, the network-accessible computing device(s) 108, drivers for interacting with hardware devices, communication protocols for sending and/or receiving data to and from the network 106 as well as other computing devices, and additional software applications. Depending on the configuration and type of local computing device 104 and/or the network-accessible computing device (s) 108, the memory 116 may be volatile (such as RAM) and/or non-volatile (such as ROM, flash memory, etc.).

The information-processing system 112 may also include additional computer-readable media such as removable storage, non-removable storage, local storage, and/or remote storage. The memory 116 and any associated computer-readable media may provide storage of computer readable instructions, data structures, program modules, and other data. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The information-processing system 112 may exist in whole or part on either or both of the local computing device 104 and the network-accessible computing device(s) 108. Thus, the information-processing system 112 may be a distributed system in which various physical and data components exist at one or more locations and function together to perform the role of the information-processing system 112. In some implementations all features of the information-processing system 112 may be present on the local computing device 104. In other implementations, the local computing device 104 may be a thin client that merely receives display data and transmits user input signals to another device, such as the network-accessible computing device(s) 108, which contains the information-processing system 112.

The information-processing system 112 may contain a query formulator 118 that formulates search queries for the user 102. In some implementations, the query formulator 118 may be storage in whole or part in the memory 116. In other implementations, the query formulator 118 may be implemented as part of the processing element(s) 114 such as a portion of an ASIC. Like the information-processing system 112 itself, the query formulator 118 may exist in whole or part on either or both of the local computing device 104 and the network-accessible computing device(s) 108. In implementations in which all or part of the query formulator 118 is located redundantly on multiple computing devices, selection of which computing device to use for implementing the query formulator 118 may be based on relative processing speeds, a speed of information transmission across the network 106, and/or other factors.

Figure 2:
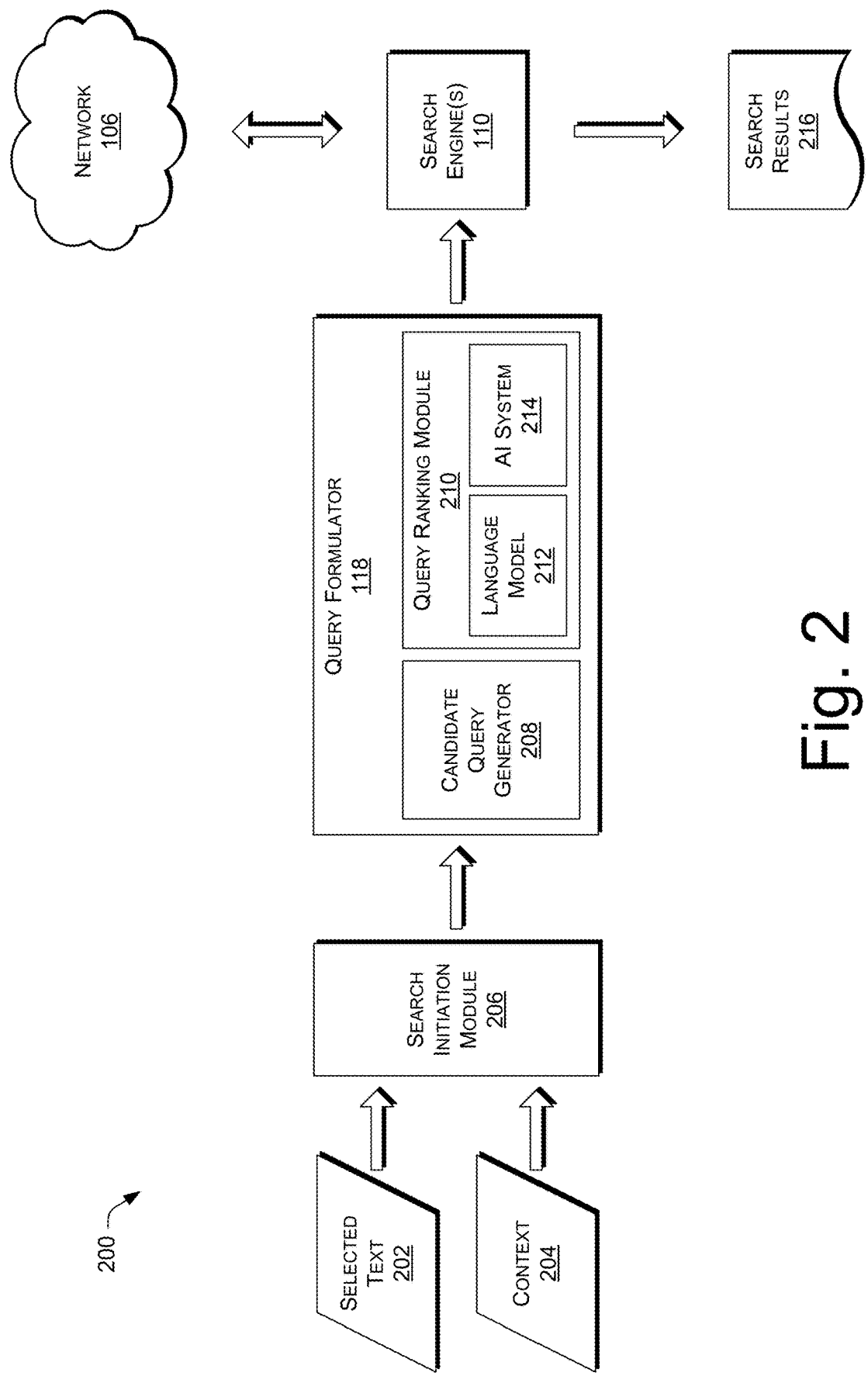
FIG. 2 shows a schematic representation of illustrative data and components from the architecture of FIG. 1.

FIG. 2 shows information and data flow through the query formulator 118 and other portions of the architecture 100 shown in FIG. 1. When the user 102 selects text from a document this provides the inputs for the query formulator 118 to formulate queries. The selected text 202 and the context 204 are received by a search initiation module 206. The selected text 202 may be selected by the user 102 interacting with the local computing device 104 to select or indicate a passage or passages of text by any conventional mechanism for selecting text from a document. The context 204 may include other text in the document that surrounds or is located near the selected text 202. The context 204 may also include classification of the document based on intended or likely use of the document. For example, if the document is a web page and the web page is identified as a merchant web page for selling goods and services, then the context 204 may recognize that the user 102 is likely searching for a good or service to purchase. Previous actions of the user 102 before selecting the text 202 may also provide the context 204. For example, search queries recently submitted by the user 102 may provide context 204 regarding the topic or area that the user 102 is currently searching.

The search initiation module 206 may interpret a single input from the user that selects the selected text 202 as a selection of text and as a command to generate a search query based on the selected text 202. For example, if the user 102 moves a cursor to select a contiguous series of text from a document, the user 102 does not need to paste or move this text to a different interface to receive search query suggestions. Selection of the text itself may be interpreted by the search initiation module 206 as a command to generate one or more search queries. This dual role of the search initiation module 206 allows the user to both select text and request search queries with only a single input or interaction with the local computing device 104.

The search initiation module 206 passes the selected text 202, the context 204, and the command to generate search queries to the query formulator 118. The query formulator 118 may include a candidate query generator 208 that generates candidate queries from the selected text 202. The candidate query generator 208 may apply query expansion or query reformulation techniques to the selected text 202. The candidate query generator 208 may create candidate queries from the selected text 202 by including synonyms, adding alternate morphological forms of words, correct spellings of misspelled words, and/or providing alternative spellings of words. When users fail to precisely select text of interest, e.g., when the text is selected by drawing an oval around it (using finger), a word or phrase may be accidently split into two parts. The post processing work may include removing irrelevant characters or prefixing/appending relevant characters from the selected text. In some implementations, a query log of queries associated with the document is used to generate candidate queries. Query expansion techniques that use the query log may include applying a K-means algorithm to the query log, conducting a random walk on a bipartite query-document graph generated by parsing the query log, running a PageRank algorithm on a query-flow graph generated from the query log, or mining term association patterns from the query log.

The candidate query generator 208 may directly generate candidate queries or the candidate query generator 208 may pass the selected text 202 to another module or system outside of the query formulator 118 (e.g., a query reformulator module associated with a search engine). The candidate query generator 208 may effectively generate the candidate queries by passing the selected text 202 to another system or module and then receiving the candidate queries from the outside module or system. The candidate query generator 208 may generate any number of queries from the selected text 202. In some implementations, the number of candidate queries generated by the candidate query generator 208 may be limited to a predefined number such as 3 queries, 10 queries, etc.

Once a number of candidate queries are obtained, a query ranking module 210 may rank the candidate queries based on a likelihood or probability that those queries correspond to the selected text 202 and the context 204. The query formulator 118 may perform both the generation of candidate queries and the ranking of those candidate queries without submitting inquiries to the search engine 110 thereby reducing the burden on the search engine 110.

The query ranking module 210 may rank the one or more candidate queries based one or more ranking techniques. Ranking techniques that may be used include a language model 212 and an artificial intelligence (AI) system 214. Each may be used independently or in combination.

The language model 212 may create a bi-gram representation of the context 204 and the selected text 202. The context 204 may include a portion of text from the document that includes the selected text 202. Thus, the context 204 may be the selected text 202 plus additional text from the document. The language model 212 may determine relative rankings of the candidate queries from the candidate query generator 208 based on a number of words in each of the respective of candidate queries, a number of words in the selected text 202, and a number of words in the portion of text that makes up the context 204. Details of one implementation of the language model 212 are discussed below.

The artificial intelligence system 214 may be implemented as any type of artificial intelligence or machine system such as a support vector machine, neural network, expert system, Bayesian belief network, fuzzy logic engine, data fusion engine, and the like. The artificial intelligence system 214 may be created from human-labeled training data. A corpus of <document, query> tuples representing documents and queries associated with those documents obtained from past document consumption and searching behavior of one or more users may serve as all or part of the training data. In some implementations, the tuples may be obtained from search logs from the search engine 110 from users that have elected to provide their browsing and search behavior to the search engine 110. The browsing and search data may be anonymized to protect the privacy of users who choose to contribute their data. The human labelers review the tuples determine if there is a causal relationship between the document and the query. In other words, the human labelers assign a label to each tuple based on their subjective evaluation of the probability that content of a document in a tuple caused the users to submit the query in the tuple. Details of one implementation of the artificial intelligence system 214 are discussed below.

Once the query formulator 118 has formulated queries and ranked those queries, the user 102 may be presented with a ranked list of the queries. The queries with higher rankings may be listed earlier or in a more prominent position in the list than those queries with lower rankings. The user 102 may select one of the candidate queries to initiate a search on one or more search engines 110 based on the query.

The search engine(s) 110 may submit the query to the network 106 or another data store and receive search results 216 based on the search algorithm, the selected query, and the data available in the network 106. The search engine(s) 110 may use any conventional searching technique for processing the selected search query.

Illustrative Language Model

The language model 212 ranks the candidate queries based on the context 204. The candidate queries are ranked by a conditional probability p(q|s,c), which represents the possibility of one of the queries from the candidate queries, query q, to be generated given the selected text 202, represented as s, and the context 204, represented as c. The language model 212 assumes that $q=qw_1,qw_2,qw_{N_q}$, $s=sw_1$, $sw_2$, $sw_{N_s}$, and $c=cw_1,cw_2,cw_{N_c}$ where $qw_i$, $sw_i$, and $cw_i$ represent the $i^{th}$ word in query q, selected text s, and context c respectively. In the language model 212, $N_q$ denotes the word length of query q, $N_s$ denotes the word length of selected text s, and $N_c$ denotes the word length of context c.

The language model 212 includes a further assumption that, conditioned by the selected text s and context c, each query word $qw_i$ is only dependent on its preceding word $qw_{i-1}$. This assumption is similar that the assumption made for a bi-gram language model. A bi-gram representation is desirable for some implementations because a uni-gram model may not catch the term-level relationship inside a query. Conversely, n-gram (n≥3) approaches may have high computational complexity that could potentially be too time-consuming for online query suggestion. However, as processing capabilities continue to increase the computational complexity of 3-gram (or higher) approaches will likely become less time consuming and it is contemplated that the language model 212 can be adapted to accommodate n-gram (n≥3) approaches.

From the definitions and assumptions above, the possibility of one of the queries from the candidate queries to be generated given the selected text 202 and the context 204 may be represented as:

$$p(q|s,c) = p(qw_1|s,c)\prod_{i=2}^{N_q} p(qw_i|s,c,qw_i-1). \tag{1}$$

In the above formulation that longer queries tend to have smaller probabilities. To alleviate this effect, the probability is multiplied by an additional weight and longer query is assigned a larger weight. The revised probability can be calculated by:

$$p(q|s,c) \propto \Lambda^{N_q} \cdot p(qw_1|s,c)\prod_{i=2}^{N_q} p(qw_i|s,c,qw_i-1) \tag{2}$$

where $\Lambda$ is a constant larger than 1.

The formulation to calculate $p(qw_i|s,c)$ is:

$$p(qw_i|s,c) = \frac{p(qw_i,s,c)}{p(s,c)} \propto p(qw_i|s,c) = p(qw_i)p(s,c|qw_i) \tag{3}$$

p(s,c) can be ignored here since each of the candidate queries being ranked is based on the same selected text s and context c.

A global query corpus can be used to estimate the value of $p(qw_i)$. Given a query corpus Q, the value of $p(qw_i)$ can be computed by:

$$p(qw_i) = \frac{|Q(qw_i)|}{|Q|} \quad (4)$$

where $|Q(qw_i)|$ denotes the number of queries in the query corpus which contain the word $qw_i$ and $|Q|$ stands for the total number of queries in the global query corpus.

A smoothed version of equation 4 may be used:

$$\tilde{p}(qw_i) = \frac{|Q(qw_i)| + a \cdot (|Q| + 1)}{|Q| + (|Q| + 1)} \quad (5)$$

where a is a constant between 0 and 1.

Another probability in equation 3 can be derived as follows. Assuming that the selected text s and context c are independent conditioned by any query word $qw_i$:

$$p(s,c|qw_i) = p(s|qw_i)p(c|qw_i). \quad (6)$$

To simplify the function, the language model 212 further assumes that conditioned by any query word $qw_i$, the words of selected text s or context c can be generated independently. Thus, $$p(s|qw_i) = \prod_{j=1}^{N_s} p(sw_j|qw_i) \quad (7)$$

$$p(c|qw_i) = \prod_{j=1}^{N_c} p(cw_j|qw_i) \quad (8)$$

where $p(sw_j|qw_i)$ is the probability of $sw_j$ to appear together with $qw_i$ when $qw_i$ exists. This probability can be estimated using the global query corpus:

$$p(sw_j|qw_i) = \frac{|Q(sw_j) \cap Q(qw_i)| + a \cdot (|Q(qw_i)| + 1)}{Q(qw_i) + (|Q(qw_i)| + 1)} \quad (9)$$

where $|Q(sw_j) \cap Q(qw_i)|$ is the number of queries containing $sw_j$ and $qw_i$ simultaneously in the global query corpus, $|Q(qw_i)|$ denotes the number of queries in the query corpus which contain the word $qw_i$, and $a \in (0,1)$ is used for smoothing.

The value of $p(cw_j|qw_i)$ can be computed similarly. According to equations 7 and 8, the values of $p(s|qw_i)$ and $p(c|qw_i)$ are unbalanced since $N_s$ is always much smaller than $N_c$. The normalized values of $p(s|qw_i)$ and $p(c|qw_i)$ may be used to solve this unbalance.

The normalized formulation of $p(s|qw_i)$ is:

$$\tilde{p}(s|qw_i) = \prod_{j=1}^{N_s} p(sw_j|qw_i))^{\frac{1}{N_s}}. \quad (10)$$

Similarly, the normalized value of $p(c|qw_i)$ can be calculated by:

$$\tilde{p}(c|qw_i) = \prod_{j=1}^{N_c} p(cw_j|qw_i))^{\frac{1}{N_s}}. \quad (11)$$

The formulation for calculating $p(qw_{i-1}|s,c,qw_{i-1})$ is:

$$p(qw_{i-1}|s,c,qw_{i-1}) = \frac{p(qw_i, qw_{i-1}|s,c)}{p(qw_{i-1}|s,c)} \quad (12)$$

where $p(qw_{i-1}|s,c)$ can be calculated by equation 3. Because $p(s,c)$ takes the same value for all the candidate queries based on the same selected text 202 and the same context 204:

$$p(qw_i, qw_{i-1}|s,c) = \frac{p(qw_i, qw_{i-1}, s, c)}{p(s,c)} \propto p(qw_i, qw_{i-1}, s, c) \quad (13)$$
$$= p(qw_{i-1})p(qw_i|qw_{i-1})p(s,c|qw_i, qw_{i-1})$$

where $p(qw_{i-1})$ can be computed by equation 5. $p(qw_i|qw_{i-1})$ is the probability of $qw_i$ to appear right after $qw_{i-1}$ when $qw_{i-1}$ exists. However, when calculating this probability using the global query corpus, the words $qw_{i-1}$ and $qw_i$ may seldom appear in succession because the global query corpus is sparse. To account for that possibility, $p(qw_i|qw_{i-1})$ may be estimated as the probability of $qw_i$ to appear together with $qw_{i-1}$ when $qw_{i-1}$ exists (without requiring that $qw_i$ and $qw_{i-1}$ appear in immediate succession), which can be computed according to equation 9.

Finally, the formulation for calculating the probability $p(s,c|qw_i,qw_{i-1})$ is provided below. To simplify, the language model 212 assumes that the selected text s and context c are independent conditioned on the two query words $qw_i$ and $qw_{i-1}$. This yields:

$$p(s,c|qw_i,qw_{i-1}) = p(s|qw_i,qw_{i-1}) \cdot p(c|qw_i,qw_{i-1}). \quad (14)$$

Similar to equation 7, the language model 212 assumes that conditioned by the two query words $qw_i$ and $qw_{i-1}$, the words in the selected text s or context c can be generated independently. Thus, $$p(s|qw_i, qw_{i-1}) = \prod_{j=1}^{N_s} p(sw_j|qw_i, qw_{i-1}) \quad (15)$$

$$p(c|qw_i, qw_{i-1}) = \prod_{j=1}^{N_c} p(cw_j|qw_i, qw_{i-1}) \quad (16)$$

where $p(sw_j|qw_i,qw_{i-1})$ can be estimated by the global query corpus:

$$p(sw_j|qw_i, qw_{i-1}) = \frac{|Q(sw_j) \cap Q(qw_i) \cap Q(qw_{i-1})| + aL}{|Q(qw_i) \cap Q(qw_{i-1})| + L} \quad (17)$$

$$L = |Q(qw_i) \cap Q(qw_{i-1})| + 1 \quad (18)$$

where $|Q(sw_j) \cap Q(qw_i) \cap Q(qw_{i-1})|$ stands for the number of queries in the global query corpus which contain the words $sw_j$, $qw_i$, and $qw_{i-1}$ simultaneously. $|Q(qw_i) \cap Q(qw_{i-1})|$ and a have similar meanings as in equation 9.

Similar to equation 10, the probability of $p(s|qw_i,qw_{i-1})$ may be normalized:

$$\tilde{p}(s \mid qw_i, qw_{i-1}) = \prod_{j=1}^{N_s} p(sw_j \mid qw_i, qw_{i-1}))^{\frac{1}{N_s}}.$$

The value of $p(c|qw_i,qw_{i-1})$ can be calculated and normalized similarly.

Illustrative Artificial Intelligence System

The artificial intelligence system 214 may implement a classification technique for ranking candidate queries. In the classification technique, human reviewers evaluate associations between documents and queries q associated with those documents. Prior to labeling by the human reviewers it may be unknown whether the content of the document caused the query or if the association between the document and the query is merely coincidental or unrelated to the document.

The human labelers classify the query from one of the document-query pairs as either associated with the content of the document, not associated with content of the document, or ambiguously related to the content of the document. Thus, the human labelers review a corpus of <document, query> tuples. The tuples may be generated by actual browsing and searching behavior of users and stored in a global query corpus. This may be the same global query corpus used by the language model 212. Each document in the <document, query> tuples may be represented as selected text s from the document and the context c that includes the selected text s. Therefore, the work of the human labelers may be represented as labeling pairs of <s, c> and q, which are then used as training data for the artificial intelligence system 214. In some implementations, only pairs of <s, c> and q in which the query is labeled as associated with the content of the document may be used as training data.

The artificial intelligence system 214 uses the training data to learn a function $f(<s,c>q) \rightarrow \{-1, +1\}$. The function $f$ can be applied to new data such as the selected text 202, context 204, and queries candidates from FIG. 2 to predict a confidence level that the respective candidate queries are associated with the content of the document. The confidence level for various query candidates may be used to rank the query candidates by the query ranking module 210.

The manual labeling of document-query relationships may be tedious. Pseudo-training data may be used to reduce the manual labeling efforts and to obtain a larger amount of training data to improve the accuracy of the function $f$. Pseudo-training data may be created by identifying search queries in the global query corpus that were submitted by users shortly after the users viewed a document paired with the query. This close temporal relationship may suggest that the content of the document caused the user to generate the query q. Automatic textual comparison of similarity between search query q and content c of the document may, or may not, identify a phrase p in the document that is similar to the search query q. If such phrase p is identified by the automatic analysis, it is assumed that the phrase p, given the surrounding context c, may have caused or induced the search query q. This generates (<p, c>, q) pairs without manual labeling that can be added to the training data for the artificial intelligence system 214.

Illustrative User Interfaces

Figure 3:
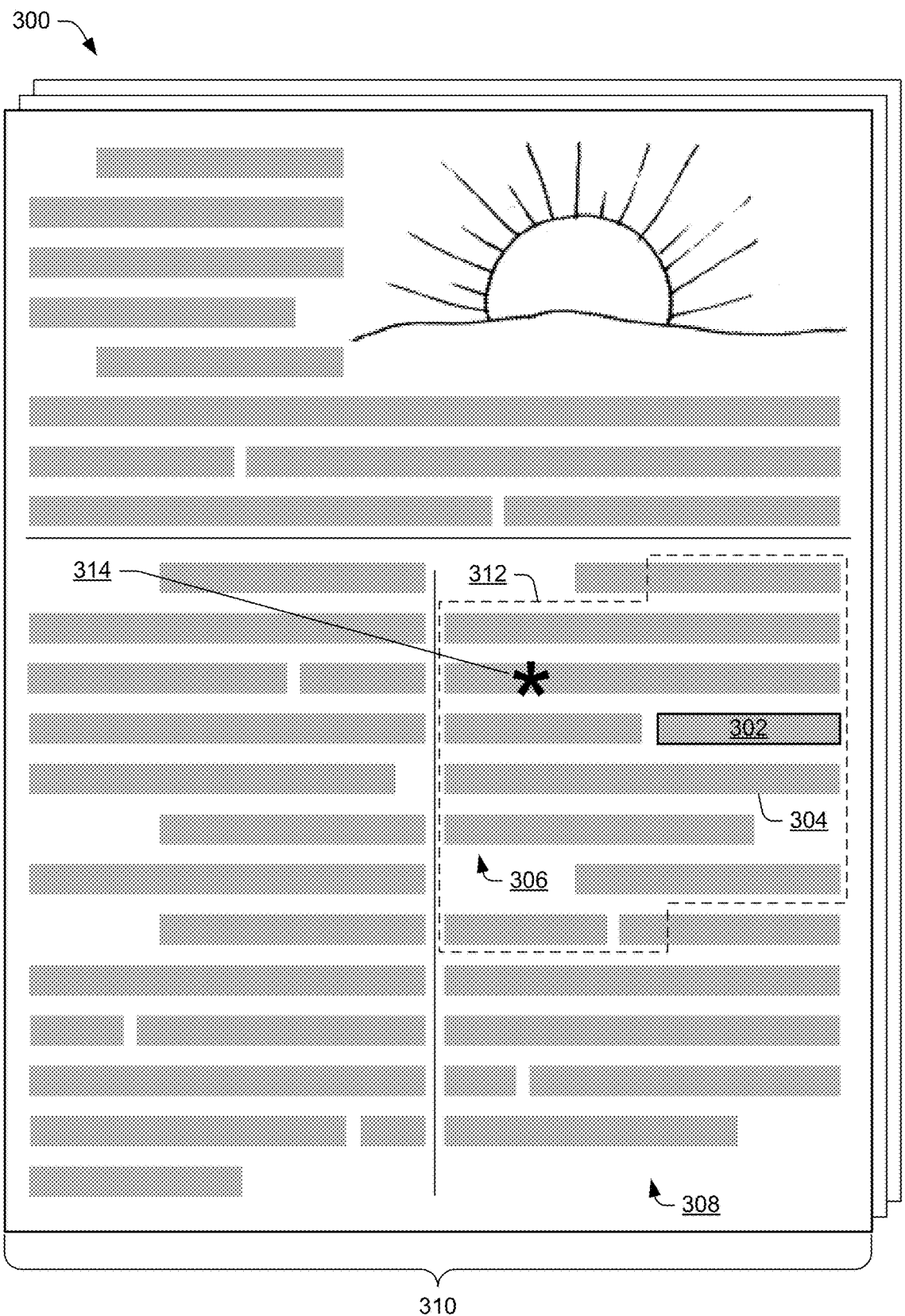
FIG. 3 shows an illustrative document with selected text.

FIG. 3 shows an illustrative document 300 that may be displayed on the local computing device 104. The document 300 may be a web page, a text document, a word processing document, a spreadsheet document, or any other type of document containing text in any format including, but not limited to, a document written in a markup language such as hypertext market language (HTML) or extensible markup language (XML). The document 300 illustrates multiple examples of context for text selected by the user 102.

User selected text 302 is shown by a bold rectangle surrounding the word or words selected by the user 102. The user 102 may also select partial words or single characters. The selected text 302 indicates a portion of the document 300 that is receiving the use's attention. The selected text 302 exists within the context of the document 300. The amount of the document 300 that is considered as the context by the language model 212 or the artificial intelligence system 214 may vary.

In some implementations, the entire document 300 may provide the context for the selected text 302. The entire document 300 may include multiple pages some of which are not displayed and some of which may not have not been viewed by the user. A narrower view of the context may include only the sentence 304 that includes the selected text 302. In other implementations, the context may be defined as the paragraph 306 that includes the selected text 302, a column 308 (or frame in a web page layout) that includes the selected text 302, or a page 310 of the document 300 that includes the selected text 302. For any type of document including those documents without sentences, paragraphs and/or pages, the context may be defined as a relatively larger or relatively smaller portion of the entire document 300.

The context may also be a portion of text 312 that has a predefined number of words or characters and includes the selected text 302. For example, a 60 word segment of the document 300 including the selected text 302 may be used as the context. This portion of text 312 may span multiple sentences, paragraphs, columns, or the like and begin or end in the middle of a sentence, paragraph, column, etc. The 60 word length is merely illustrative and the context may be any length such as 100 words, 20 words or alternatively be based on characters and include 20 characters, 100 characters, 500 characters, or some other number of words or characters.

In some implementations, the selected text 302 is located substantially in the middle of the portion of text 312. For example, if the selected text 302 has three words and the portion of text 312 includes 60 words, then the selected text 302 may be located about 23 or 24 words (i.e., 60−3=57; 57÷2=23.5) from the beginning of the portion of text 312 that makes up the context. In some implementations, the selected text 302 may be located in the middle 50% of the portion of text 312 (i.e., not in the first ¼ and not in the last ¼) or in the middle 20% of the portion of text 308 (i.e., not in the first 40% and not in the last 40%).

Calculation of the number of words, or characters, in the portion of text 308 may exclude stop words in order to base the context on words that may be most useful for ranking search queries. For example, a 20-word context centered around the selected text 302 may be of less assistance in ranking search queries if words such as "a", "the", "and", "it" and other types of stop words are included in the 20 words of the context. Thus, the predetermined number of words in the portion of text 302 that makes up the context may be a predetermined number of words excluding stop words.

FIG. 3 also illustrates the location of a pre-formulated search query 314 within the document 300. The pre-formulated search query 314 may be associated with a portion of the document prior to the selection of the text by the user. For example, the pre-formulated search query 314 may be associated with a particular word, sentence, paragraph, column, page, etc. in the document 300. This example shows the pre-formulated search query 314 as associated with the sentence immediately before the selected text 302. Depending on the extent of the document 300 that is considered as context for the selected text 302, the pre-formulated search query 314 may or may not be included in the same portion of the document 300 as the selected text 302. If, for example, the sentence 304 that contains the selected text 302 is the context, then the pre-formulated search query 314 is not associated with the same part of the document 300 as the selected text 302. However, if the context is the paragraph 306, then the pre-formulated search query 314 is associated with the same part of the document 300 as the selected text 302.

The document 300 may contain zero, one, or multiple pre-formulated search queries 314. The pre-formulated search query(s) 314 may be queries that a user would be likely to conduct when consuming the associated portion of the document 300. The pre-formulated search query(s) 314 may be manually crafted by a human author for embedding in a specific portion of the document 300. Alternatively, or additionally, one or more of the pre-formulated search query(s) 314 may be determined based on analysis of query logs from other users that view the document 300 and subsequently generated a search query.

The candidate query generator 208 shown in FIG. 2 may obtain the pre-formulated search query(s) 314 together with other search queries generated from the selected text 302. In some implementations, the candidate query generator 208 may include all pre-formulated search query(s) 314 associated with the document 300 in the list of search queries presented to the user. In other implementations, the candidate query generator 208 may include only the pre-determined search query(s) 314 that is associated with the same portion, based on the definition of context, of the document 300 as the selected text 302. In yet a further implementation, only a threshold number (e.g., 1, 2, 3) of pre-determined search query(s) 314 that are associated with a location in the document 300 that is closest to the location of the selected text 302 are included in the list of search queries presented to the user.

Once the user selects a query from the list of candidate queries, that selected query may be used as pre-determined search query 314 for subsequent presentations of the document 300. That pre-determined search query 314 may be associated with the location of the selected text 302 that originally generate the search query. Thus, the number of pre-determined search queries 314 associated with the document 300 may increase as use of the system increases.

Figure 4:
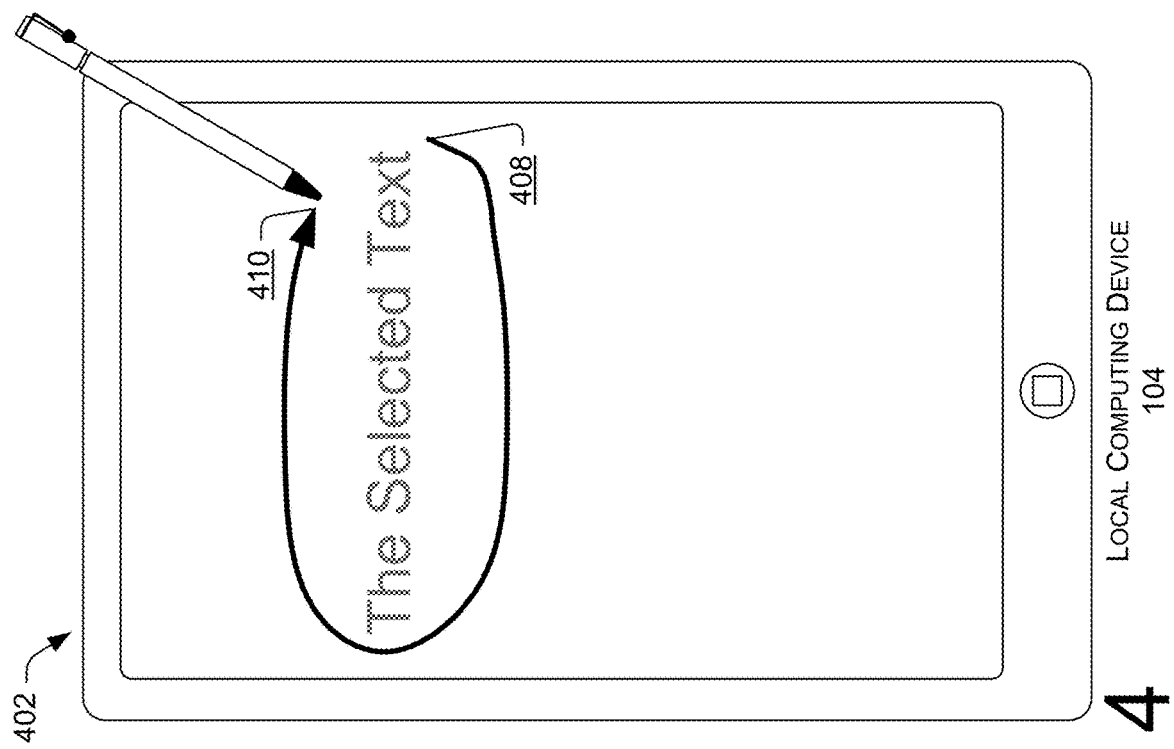
FIG. 4 shows two illustrative user interfaces for selecting text.
Figure 4:
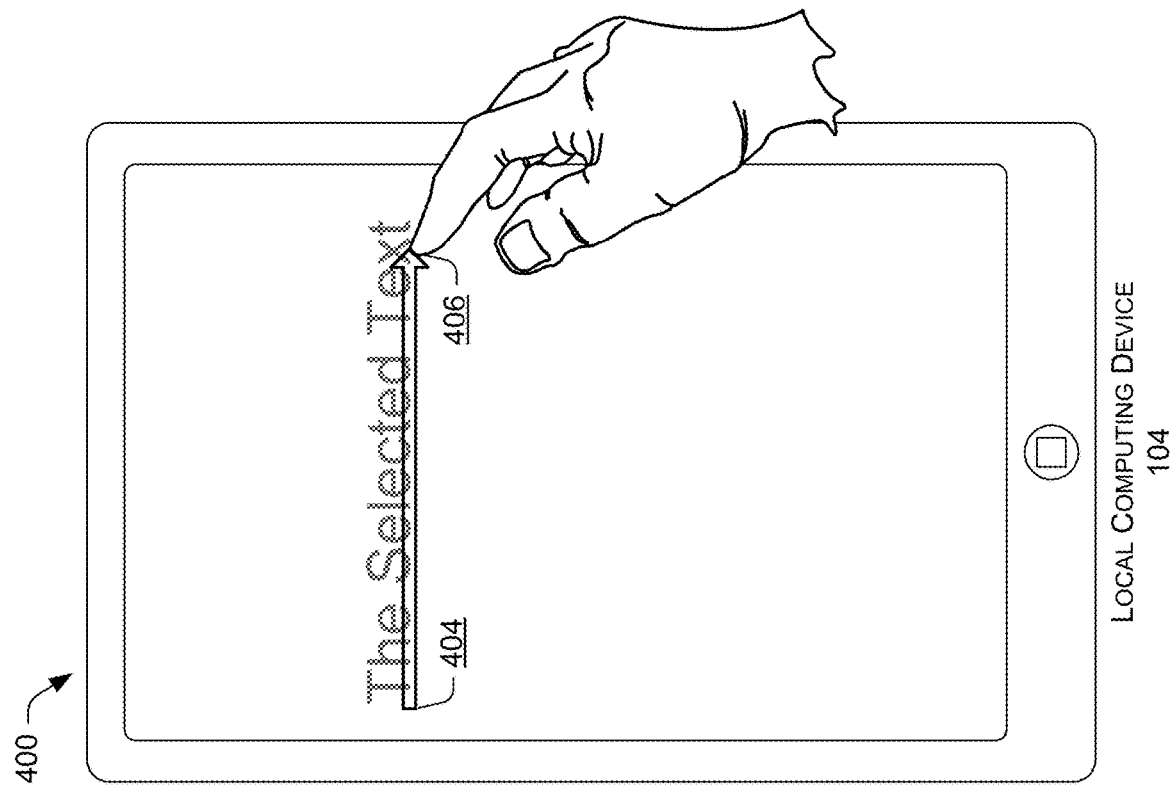

FIG. 4 shows two illustrative user interfaces 400 and 402 for selecting text on a touch-screen device. The local computing device 104 from FIG. 1 may be implemented as a device that has a touch-screen display. In the first user interface 400 the user drags his or her finger (or other pointing implement such as a stylus) across the surface of the touch screen from a point 404 at the start of the text to select to a point 406 and the end of the text he or she wishes to select. The user may draw his finger through the middle of the text, along the bottom of the text as if he or she is underlining the text, or in another motion that is generally in line with the flow of the text (e.g., left to right for English, but the direction of movement may be different for different languages). The signal for the system to formulate search queries from the selected text may be cessation of movement of the finger when it comes to rest at the end point 406, lifting of the finger from the surface of the touch screen, a tap on the touch screen at the end point 406, etc.

The user may also select text, as shown in the second user interface 402, by moving a stylus (or other pointing implement such as a finger) in a generally circular shape around the text that the user intends to select. The generally circular shape may be more ovoid than circular in shape and it may be either a closed circle in which the starting point 408 and the ending point 410 touch or an open arc in which the starting point 408 is in a different location than the ending point 410.

In this example, the circle is drawn in a clockwise direction starting at a point 408 on the lower right of the selected text moving around to a point 410 at the top right of the selected text. In some implementations, circles drawn in either clockwise or counterclockwise directions may both cause the same result. However, in other implementations initiating the generation of search queries may occur only when the circle is drawn in a clockwise (or alternatively counterclockwise) direction. The signal for the system to formulate search queries from the selected text may be cessation of movement of the stylus when it comes to rest at the end point 410, lifting of the stylus from the surface of the touch screen, closure of the circle when the stylus returns to starting point 408, a tap on the touch screen at the end point 410, or some other gesture representing the end of text selection and requesting initiation of search queries generation.

Either of the user interfaces 402 and 404 shown in FIG. 4 provides a convenient way for the user to initiate the search process without multiple commands, use of a keyboard, or switching to an interface other than the document that he or she was consuming.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the architectures, systems, and user interfaces shown in FIGS. 1-4. However, the processes may be performed using different architectures, systems, and/or user interfaces.

Figure 5:
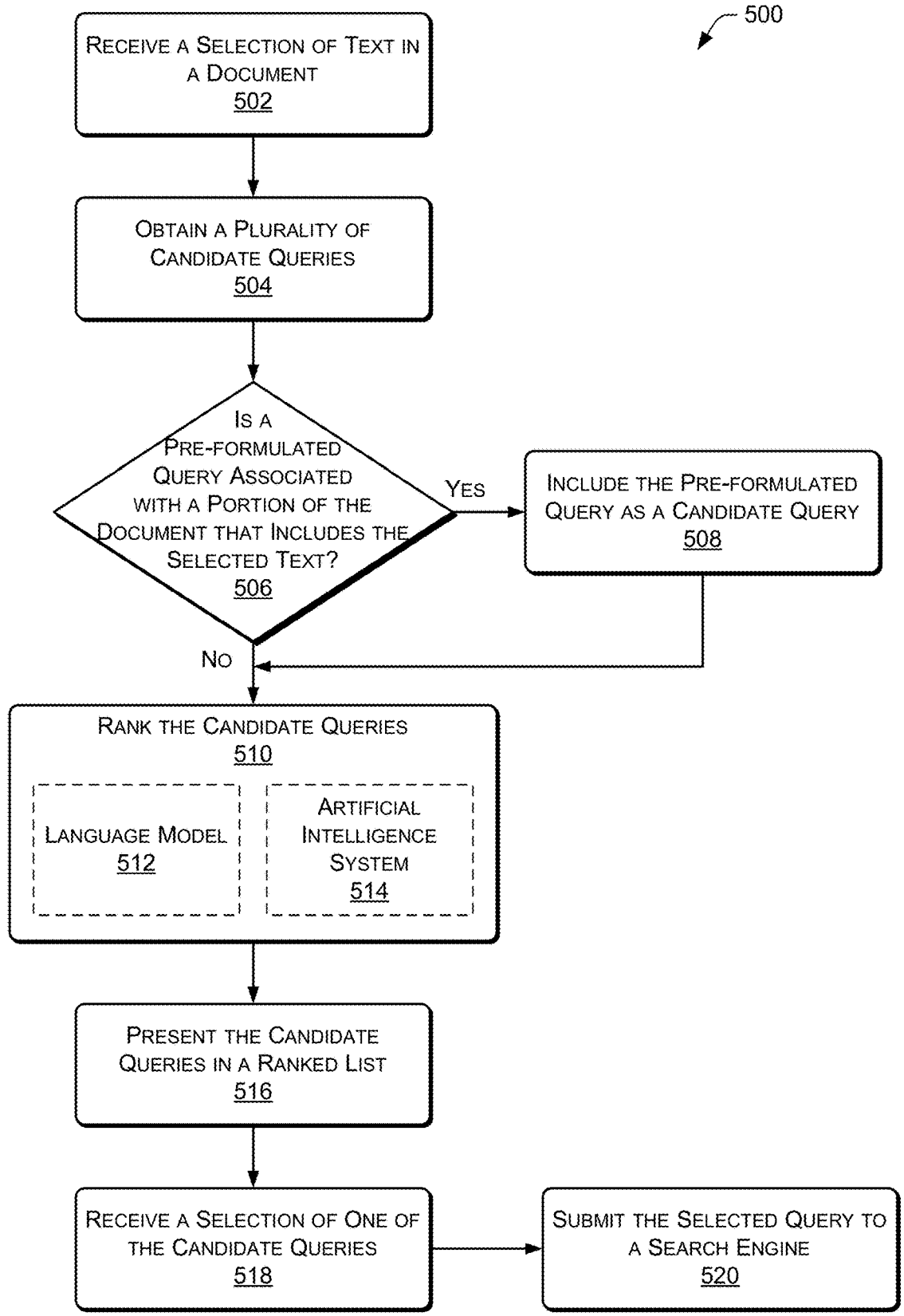
FIG. 5 is an illustrative flowchart showing an illustrative method of providing a ranked listed of candidate queries in response to a user selection of text.

FIG. 5 illustrates a flowchart of a process 500 for identifying and presenting candidate queries to a user. At 502, a selection by a user of text in a document is received. The user may be the user 102 shown in FIG. 1 and the selection may be received by the information-processing system 112. The selected text may be a contiguous series of text such as one, two, three, four, etc. words in a row or selections of multiple words or combinations words from multiple places in the document. The document may be a web page, a text document, a word processing document, an electronic book, or any other type of document.

At 504, multiple candidate queries are obtained. The candidate queries may be obtained directly or indirectly from the candidate query generator 208. The candidate queries are generated by applying one or more query expansion techniques to the text selected at 502. The query expansion techniques may include any technique that compares the selected text with a previous query log to identify one or more queries from the previous query log based on the selected text. Illustrative techniques include applying a K-means algorithm to a query log, conducting a random walk on a bipartite query-document graph generated by parsing a query log, running a PageRank algorithm on a query-flow graph generated from a query log, or mining term association patterns from a query log.

At 506, it is determined if there are any pre-formulated queries associated with the document. The pre-formulated queries may be identified based on query logs of past searching behavior, created by a human editor, or generated by any other technique for creating search queries. The pre-formulated queries may be associated with a specific portion of the document such as a specific word, sentence, paragraph, page, etc. such as, for example the pre-formulated query 314 shown in FIG. 3. When the text selected by the user is from the same portion of the document as the pre-formulated query, process 500 proceeds along the "yes" path to 508. If, however, the document is not associated with any pre-formulated queries or if the pre-formulated queries associated with the document are not associated with the portion of the document that includes the selected text, then process 500 proceeds along the "no" path to 510.

At 508, the pre-formulated query is included in the set of candidate queries obtained at 504. The pre-formulated query may be obtained faster than the other queries obtained at 504 because it is pre-formulated and may not require processing or analysis to generate.

At 510, the candidate queries obtained at 504, including any pre-formulated queries identified at 508, are ranked. The ranking of the candidate queries provides a higher rank to those queries that are more likely to return results desired by the user based on the text selected at 502. The ranking may be based on a language model 512 that considers a context provided by the document. The context may be represented by text in the document that includes the text selected by the user at 502 and additional text (i.e., the context includes at least one additional word or character more than the text selected by the user). The ranking may additionally or alternatively be based on an artificial intelligence system 514. The artificial intelligence system 514 is trained with a set of document and query pairs (i.e., training data) that is validated by human review. The human reviewers evaluate the document and query pairs to identify those that have a query which is related to the content of the document paired with the query.

At 516, the candidate queries are presented to the user in a ranked list ordered according to the ranking. The ranked list may be shown to the user in an interface that also displays the document from which the user selected the text so that the user can view the document and selected text while choosing a search query. Alternatively, the document may no longer be shown, but instead the document may be replaced by the list (e.g., on devices with display areas too small to show both). Additional techniques for displaying the list are also contemplated such as presenting the list in a pop-up box, a drop-down menu, etc. Thus, the selection of text at 502 may cause the display of a list of recommended queries ranked in order of relevance based on the selected text and the surrounding context.

At 518, a selection by the user of one of the candidate queries from the list is received. The user may make the selection by any conventional technique for selecting an item from a list. Thus, the user is able to take the search query from the list that most closely represents his or her intention when selecting the words at 502 to search.

At 520, the query selected by the user is submitted to one or more search engines such as search engine(s) 110. The user may then receive search results from the search engine. Thus, with this method 500 the user may obtain search results based on a search query that is better designed to generate effective results than simply searching for words in selected from the document and use the user can receive those results with only minimal interactions with the document and/or search engine interface.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations of generating search queries.

The invention claimed is:

1. An information-processing system comprising:
one or more processing elements;
a search initiation module communicatively coupled to or integrated with the one or more processing elements, the search initiation module configured to:
   receive an input indicating text selected in a user interface for presenting a document displayed in a device; and
   determine a context of the selected text, the context including a portion of the document that is additional text separate from the selected text;
a candidate query generator coupled to or integrated with the one or more processing elements and configured to identify a plurality of candidate queries based on the selected text, the determined context, and search queries generated by users after viewing the document; and
a query ranking module coupled to or integrated with the one or more processing elements and configured to:
   compare each candidate query of the plurality of candidate queries to the selected text and the context;
   determine a value associated with each candidate query based on the selected text, and the determined context, the value representing a likelihood that the candidate query corresponds to the selected text and the determined context; and
   rank the plurality of candidate queries based at least in part on the value, wherein one or more of the candidate queries are presented on the user interface while the document is being presented based on the determined values.

2. The information-processing system of claim 1, wherein the candidate query generator is further configured to include, in one or more candidate queries of the plurality of candidate queries, at least one of synonyms of words in the selected text, alternate morphological forms of words in the selected text, correct spellings of misspelled words in the selected text, or alternative spellings of words in the selected text.

3. The information-processing system of claim 1, wherein the value for each candidate query is determined by an artificial intelligence system, wherein the artificial intelligence system is trained with training data comprising a history of searches originated by users when browsing a corpus of documents, the history of searches being labeled by human labelers indicating a probability that content of a document caused a respective user to submit the corresponding query in the history.

4. A method comprising:
receiving, in a user interface for presenting a document, a selection of text in the document;
determining a context of the selection, the context including additional text from the document that is relative to, and separate from, the selection;
generating a plurality of candidate queries that includes queries generated at least in part by applying one or more query expansion techniques to the text and the context;
comparing each candidate query of the plurality of candidate queries to the text and the context;
determining a value for each candidate query based on the selection of text, and the determined context, the value representing a likelihood that the candidate query corresponds to the selection of text and the determined context;
ranking, by one or more processing elements, the plurality of candidate queries based at least in part on the values;
presenting the plurality of candidate queries in a list ordered at least partly according to the ranking, wherein one or more of the candidate queries are presented on a user interface while the document is being presented based on the determined values;
receiving, in the user interface, a selection of one of the presented candidate queries; and
submitting the selected candidate query to a search engine.

5. The method of claim 4, wherein the document comprises a mark-up language document.

6. The method of claim 4, wherein the plurality of candidate queries includes at least one pre-formulated query associated with the document.

7. The method of claim 4, wherein the one or more query expansion techniques comprise at least one of applying a K-means algorithm to a query log, conducting a random walk on a bipartite query-document graph generated by parsing a query log, running a PageRank algorithm on a query-flow graph generated from a query log, or mining term association patterns from a query log.

8. The method of claim 4, wherein the additional text comprises at least part of a paragraph of the document, at least part of a column of the document, at least part of a sentence of the document, at least part of a cell of the document, or at least part of a frame of the document.

9. The method of claim 4, wherein:
ranking the plurality of candidate queries is further based on a language model; and
the language model is based at least in part on a number of words in the candidate query, a number of words in the text, and a number of words in the context.

10. The method of claim 4, wherein:
ranking the plurality of candidate queries is further based on a language model; and
the language model comprises a bi-gram language model in which a word in the candidate query depends on an immediately preceding word in the candidate query.

11. The method of claim 4, wherein:
ranking the plurality of candidate queries is further based on an artificial intelligence system; and
the artificial intelligence system learns a function that predicts a level of confidence in one or more candidate queries of the plurality of candidate queries given the candidate query, the selection of text, and the context.

12. The information-processing system of claim 1, wherein the portion of the document spans at least one sentence, one paragraph, or one column of the document.

13. The information-processing system of claim 1, wherein the portion of the document includes the selected text.

14. One or more computer storage media, wherein the one or more computer storage media is at least one device, having computer-executable instructions which, when executed by a processor, cause a computing system to:
receive, in a user interface for presenting a document, a selection of text in the document;
determine a context of the selection, the context including additional text from the document that is relative to, and separate from, the selection;
interpret the selection of the text as a command to provide one or more search queries based at least in part on the text;
generate a plurality of candidate queries based at least in part on the text;
compare each candidate query of the plurality of candidate queries to the text and the context;
determine a value for each candidate query based on the selection of text, and the determined context, the value representing a likelihood that the candidate query corresponds to the selection of text and the determined context;
rank the plurality of candidate queries based at least in part on the values to determine a ranking of the plurality of candidate queries;
present, on a user interface while the document is being presented, a subset of the plurality of candidate queries in a list ordered at least partly according to the ranking;
receive, in the user interface, a selection of a candidate query of the subset of the plurality of candidate queries; and
submit the selected candidate query to a search engine.

15. The one or more computer storage media of claim 14, wherein the computer-executable instructions, when executed by the processor, further cause the computing system to receive the selection of the text based at least in part on a user dragging a pointing implement across the text that is displayed on a touch-screen display.

16. The one or more computer storage media of claim 14, wherein the computer-executable instructions, when executed by the processor, further cause the computing system to receive the selection of the text based at least in part on a user moving a pointing implement in a circular or oval shape around the text that is displayed on a touch-screen display.

17. The one or more computer storage media of claim 14, wherein at least part of the plurality of candidate queries obtained comprise one or more pre-formulated queries associated with the document that have been determined prior to the selection of the text.

18. The one or more computer storage media of claim 17, wherein the one or more pre-formulated queries are associated with the additional text.

19. The one or more computer storage media of claim 14, wherein ranking the plurality of candidate queries is further based at least in part on using a bi-gram language model that ranks the plurality of candidate queries based at least in part on a number of words in candidate queries of the plurality of candidate queries and a query corpus.

20. The one or more computer storage media of claim 14, wherein ranking the plurality of candidate queries is further based at least in part on using an artificial intelligence system that uses a data set of document/query tuples, a correspondence between a document and a query in a respective one of the document/query tuples having been verified by a human reviewer.

* * * * *